June 5, 1951  J. C. HANCOCK  2,555,851
FOLDABLE REEL
Original Filed June 21, 1946
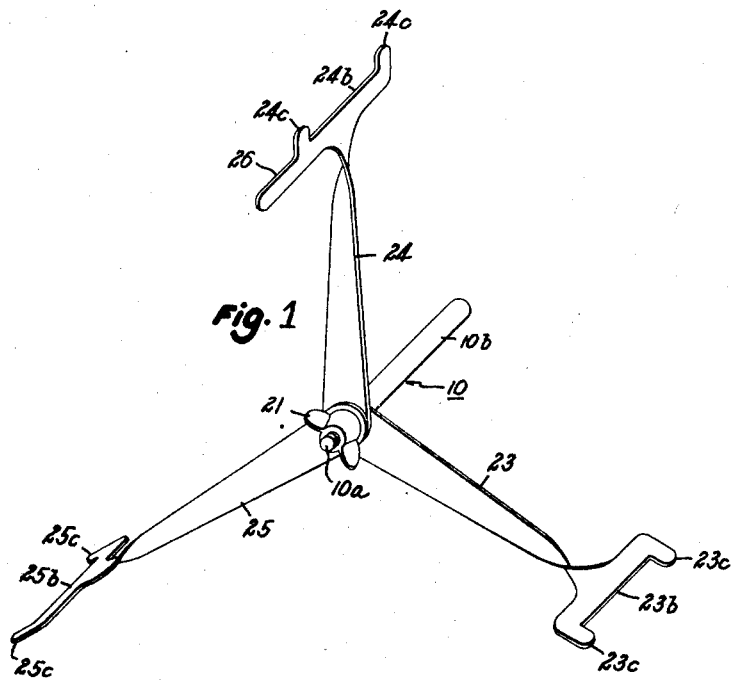
Fig. 1
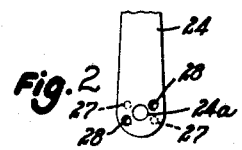
Fig. 2
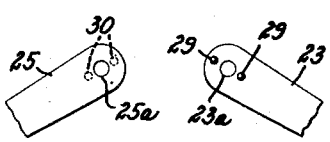
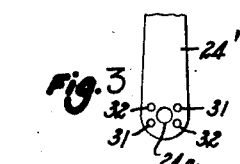
Fig. 3
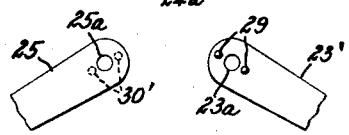
Inventor:
James C. Hancock
By Pierce, Scheffler & Parker
Attorneys Patented June 5, 1951

2,555,851

UNITED STATES PATENT OFFICE 2,555,851

FOLDABLE REEL

James C. Hancock, Roanoke, Va.

Original application June 21, 1946, Serial No. 678,415, now Patent No. 2,461,979, dated February 15, 1949. Divided and this application January 13, 1949, Serial No. 70,736

5 Claims. (Cl. 242—115)

This invention relates in general to reels and in particular to those of the folding type which are particularly suitable for use in winding on wet fish lines and the like to dry and is a division of my copending United States application Ser. No. 678,415, filed June 21, 1946, now Patent No. 2,461,979 issued February 15, 1949.

The general object of the invention is to provide a foldable reel which is of simple construction and which may be manufactured easily and at low cost.

Another object is to provide a reel which may be quickly erected from its folded position and vice versa. A more specific object is to provide a reel of the class described having a plurality of arms which extend radially from a common support spindle that serves as a handle for holding it, and in which the arms may be easily and quickly moved from a nested position to predetermined spaced angular positions about the spindle axis to thereby erect the reel.

Still another object is to provide a reel of the folding type in which all of the parts are safely secured together when folded, thereby obviating all possibility of losing any of them when the reel is being carried in its collapsed condition. Still another object is to provide a reel of the class described which may be knocked-down from its erected position without removing any of the parts. Yet another object is to provide a reel that folds flat when knocked down and which may be stored in a small space.

These and other objects and advantages of the improved reel construction will become apparent from the detailed description which follows when considered with the drawings which show preferred embodiments of the invention.

In the accompanying drawings, Fig. 1 is an isometric view illustrating the collapsible reel after being erected; Fig. 2 is a fragmentary view in plan of the reel arms showing one construction for the reel arms in accordance with the invention for locking the reel arms in spaced angular positions; and Fig. 3 is a view similar to Fig. 2 illustrating a modified form of the means for locking the arms in spaced angular positions relative to the reel axis.

Referring now to the drawings, the improved reel is comprised of a spindle 10 one end of which is threaded at 10a while the other end 10b is finished smoothly to form a hand member by which the spindle is grasped when the reel is used as shown in Fig. 1. The spindle 10 is also provided with a shoulder portion adjacent the threaded end 10a to form a stop for the reel arms.

The reel arms 23—25 which are T-shaped are stamped from sheet metal or may be made of molded plastic. These arms have holes 23a—25a at one end for assembly on the threaded portion 10a of the spindle 10 and are turned through 90° at their other end adjacent the cross piece of the T to provide winding surfaces 23b—25b for the line to be dried. Finger portions 23c—25c on the arms are provided to prevent the line from slipping off of the reel and one of the arms such as arm 24 also includes a handle portion 26 by which the reel is rotated.

One of the reel arms is provided with means whereby the other two arms may be easily locked and spaced in angular positions relative thereto, the arms being 120° apart. Thus as shown in Fig. 2, opposite face portions of the middle arm 24 adjacent the spindle opening 24a are provided, respectively, with rounded sets of recesses or dimples 27—28 that are adapted to receive complementary configured sets of bosses 29—30 provided, respectively, on the face portions of the other two arms 23 and 25 that lie on opposite sides of the middle arm 24. The complementary sets of dimples and bosses are so located on the arms that the latter will be spaced 120° apart with respect to the spindle axis when the sets are mated.

The manner of operation of the reel should now be obvious. The reel is ordinarily carried in folded position with the reel arms 23—25 nested together as closely as possible and clamped tightly to the spindle 10 by wing nut 21. When it is desired to erect the reel, wing nut 21 is loosened and the two reel arms 23, 25 shifted angularly about the spindle axis until the sets of bosses 29—30 in the reel arms 23, 25, respectively, become mated with the corresponding sets of dimples 27, 28 in the reel arm 24. The wing nut 21 is now tightened thus securing the three reel arms in their erected position tightly between the wing nut and the shoulder portion of the spindle 10. To wind on the fish line to be dried, spindle 10 is held loosely in one hand, the handle 26 is grasped in the other and the line wound on the arm portions 23b—25b by applying rotary motion to the reel about the spindle axis.

Fig. 3 illustrates a slightly modified form of the invention for the complementary angular positioning means for the three reel arms. Here the two outer arms 23' and 25' are provided with sets of bosses 29, 30 as in Fig. 2 but the middle arm 24' has two sets 31—32 of drilled openings in lieu of the separate dimple sets for receiving the complementary sets of bosses in the other two arms 23' and 25'.

In conclusion, I wish it to be understood that while I have described and illustrated certain preferred embodiments of the invention, various changes in the construction and arrangement of parts may be made without departing from the spirit and scope of the invention as defined in the appended claims.

I claim:

1. A reel of the class described comprising a spindle constituting a hand member, three reel arms mounted on said spindle adjacent each other and angularly adjustable about the spindle axis, opposite faces of the middle one of said arms being provided with locating means coregistering with complementary configured locating means provided on the adjacent faces of the outer arms for locating the latter in spaced angular positions relative to said middle arm, and means for clamping said arms to said spindle.

2. A reel as defined in claim 1 wherein the said locating means for said arms is constituted by coregistering sets of recesses and bosses.

3. A reel as defined in claim 1, wherein the means for locating each of the two outer arms with respect to the middle arm is constituted by a pair of recesses in one arm adapted to register with a pair of bosses on the other arm.

4. A reel as defined in claim 1 wherein the means for locating each of the two outer arms with respect to the middle arm is constituted by a pair of bosses on each face of said middle arm adapted to register with a pair of recesses provided on each of said outer arms.

5. A reel as defined in claim 1 wherein the means for locating the two outer arms with respect to the middle arm is constituted by two sets of apertures extending through the middle arm adapted to register respectively with a set of bosses provided on each of the outer arms.

JAMES C. HANCOCK.

REFERENCES CITED

The following references are of record in the file of this patent:

UNITED STATES PATENTS

| Number | Name | Date |
|--------|------|------|
| 325,394 | Cavilli | Sept. 1, 1885 |
| 531,938 | Heston | Jan. 1, 1895 |
| 2,198,114 | Houger | Apr. 23, 1940 |